United States Patent
Boecker et al.

(10) Patent No.: US 9,985,432 B2
(45) Date of Patent: May 29, 2018

(54) CIRCUIT FOR PROTECTION AGAINST OVERVOLTAGES

(71) Applicant: Eaton Electrical IP GmbH & Co. KG, Schoenefeld (DE)

(72) Inventors: Olaf Boecker, Alfter (DE); Horea Stefan Culca, Lohmar (DE)

(73) Assignee: EATON INTELLIGENT POWER LIMITED, Dublin (IE)

(*) Notice: Subject to any disclaimer, the term of this patent is extended or adjusted under 35 U.S.C. 154(b) by 323 days.

(21) Appl. No.: 14/926,022

(22) Filed: Oct. 29, 2015

(65) Prior Publication Data

US 2016/0141867 A1    May 19, 2016

(30) Foreign Application Priority Data

Nov. 17, 2014   (DE) .................. 10 2014 116 734

(51) Int. Cl.
*H02H 9/00*     (2006.01)
*H02H 9/04*     (2006.01)

(52) U.S. Cl.
CPC .............. *H02H 9/04* (2013.01); *H02H 9/005* (2013.01); *H02H 9/041* (2013.01); *H02H 9/042* (2013.01)

(58) Field of Classification Search
CPC ...................................................... H02H 9/04
See application file for complete search history.

(56) References Cited

U.S. PATENT DOCUMENTS

| | | | |
|---|---|---|---|
| 3,582,713 A * | 6/1971 | Till .......................... | G05F 1/571 323/278 |
| 6,111,737 A * | 8/2000 | Baldwin ............. | H01L 27/0251 361/111 |
| 6,212,050 B1 * | 4/2001 | Haider ................ | H01L 27/0251 361/111 |
| 6,226,166 B1 | 5/2001 | Gumley et al. | |
| 6,239,958 B1 * | 5/2001 | Kato ........................ | G11C 7/24 361/56 |
| 6,538,866 B1 * | 3/2003 | Hanzawa ............ | H01L 27/0251 361/111 |
| 8,068,321 B2 | 11/2011 | Yang et al. | |
| 2004/0257742 A1 | 12/2004 | Zeller et al. | |

FOREIGN PATENT DOCUMENTS

| | | |
|---|---|---|
| CN | 203415972 U | 1/2014 |
| CN | 203536954 U | 4/2014 |
| EP | 1436875 B1 | 7/2004 |
| EP | 2779379 A2 | 9/2014 |

* cited by examiner

*Primary Examiner* — Stephen W Jackson
(74) *Attorney, Agent, or Firm* — Leydig, Voit & Mayer, Ltd.

(57) ABSTRACT

A circuit for protection against overvoltages includes an input side to which an input voltage can be applied, an output side at which an output voltage can be tapped, an overvoltage protection element which is connected in parallel with the input side and which is configured to, when an overvoltage pulse occurs at the input side, conduct at least part of the overvoltage pulse away via a first current path, and a protective transistor which is connected in parallel with the output side. When an overvoltage pulse occurs at the input side, the protective transistor changes from a closed mode into an open mode forming a second current path parallel to the first current path along the protective transistor so that substantially the rest of the overvoltage pulse can be conducted away via the second current path.

16 Claims, 4 Drawing Sheets

CIRCUIT FOR PROTECTION AGAINST OVERVOLTAGES

CROSS REFERENCE TO RELATED APPLICATIONS

This application claims benefit to German Patent Application No. DE 10 2014 116 734.1, filed Nov. 17, 2014, which is incorporated by reference herein.

FIELD

The invention relates to a circuit for protection against overvoltages.

BACKGROUND

Circuits for protection against overvoltages are typically used in electronic devices that are supplied with electrical energy via supply terminals. Electronic automation devices in particular are, for example, supplied with DC voltage of +24 V. Various events, such as switching from inductive loads, lightning strikes or interference voltages being coupled in through electric lines, can lead to high-energy interference pulses (surges) being coupled into the supply voltage. The pulse voltage of such interference pulses or overvoltage pulses is very high by comparison, and can lead to electronic components in electronic devices being destroyed if suitable protective measures are not taken.

Electronic circuits therefore have to be protected against this type of fault to prevent components being destroyed. In industrial settings, overvoltage pulses of e.g. 500 V for a DC supply are specified by relevant standards (for example, the standards IEC/EN 61131-2 or IEC/EN 61000-6-2). When coupled in via an intermediate resistance of 2 Ohm, in theory this can cause current pulses of up to 250 A.

To protect electronic components from overvoltages of this type, circuits of the above type are known. Varistors, thyristors or suppressor diodes are used as default overvoltage protection elements. These components conduct at least part of a current pulse away towards a reference potential and restrict an overvoltage pulse to a considerably lower level. Depending on the type of component, overvoltage pulses of for example up to approximately 50 to 60 V (in suppressor diodes) or approximately 100 V (in varistors) can be suppressed.

Figure 1:
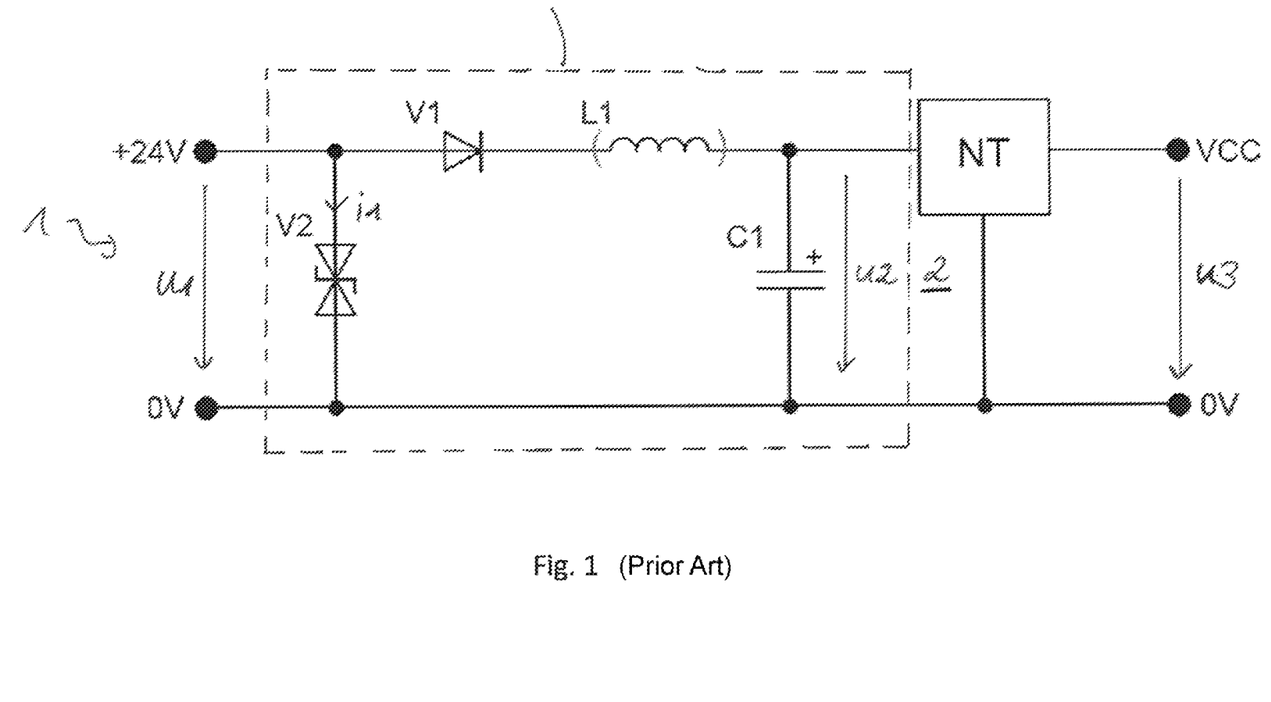
FIG. 1 shows a circuit arrangement according to the prior art for protection against overvoltages.

In protective circuits according to the prior art, an embodiment of which is shown in FIG. 1 by way of example, additional filter elements, such as a series filter coil L1 and an electrolytic buffer capacitor C1, are used in addition to suppressor diodes (cf. V2 in the protective circuit S in FIG. 1). The buffer capacitor C1 also filters an overvoltage pulse u1 at an input 1 of the circuit so that the actual level of an interference pulse is reduced further. Downstream electronic components (see voltage transformer NT in FIG. 1 or other components that can be powered at an operation side 3 by means of a VCC supply voltage u3) are protected as a result.

In the case of very small or compact devices having a very limited amount of installation space, or when an electrolytic capacitor with sufficient capacity for filtering an overvoltage pulse is either not present or unable to be used for reasons of space, the use of a suppressor diode may not be sufficient in some cases for completely suppressing an overvoltage pulse or for preventing destruction of sensitive components. In such cases, an additional protective measure is required.

It is known from the prior art to use a field-effect transistor in a series path of the protective circuit, which transistor switches on when a particular input voltage level is reached and thus protects the electrically downstream parts of the circuit. Conventional solutions are disadvantageous in that an input voltage of the protective circuit has to be significantly higher than the output voltage for the field-effect transistor to be open for normal functioning. Specifically, this may, for example, imply a voltage loss of approximately 3 V. In addition, the voltage loss of the field-effect transistor becomes very high, even with relatively high rated currents (for example from approximately 3 to 4 A). Other solutions from U.S. Pat. No. 8,068,321 B2 and CN 203415972 propose very specific transistor designs and complex controls for the protective function, respectively, which however can be complex and unfavourable in practice.

SUMMARY

According to an embodiment, a circuit for protection against overvoltages is provided. The circuit includes an input side to which an input voltage can be applied, an output side at which an output voltage can be tapped, an overvoltage protection element which is connected in parallel with the input side and which is configured to, when an overvoltage pulse occurs at the input side, conduct at least part of the overvoltage pulse away via a first current path, and a protective transistor which is connected in parallel with the output side. When an overvoltage pulse occurs at the input side, the protective transistor changes from a closed mode into an open mode forming a second current path parallel to the first current path along the protective transistor so that substantially the rest of the overvoltage pulse can be conducted away via the second current path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An embodiment of the present invention provides a circuit for protection against overvoltages including an input side to which an input voltage can be applied, an output side at which an output voltage can be tapped, and an overvoltage protection element which is connected in parallel with the input side and is designed, when an overvoltage pulse occurs at the input side, to conduct at least part of the overvoltage pulse away via a first current path which is simple, inexpensive, and compact and yet still offers sufficient protection against overvoltage pulses.

The circuit according to an embodiment of the invention uses a protective transistor in the circuit in addition to the overvoltage protection element. The protective transistor is connected in parallel with the output side of the circuit and changes from a closed mode into an open mode when an overvoltage pulse occurs at the input side. In the process, a second current path parallel to the first current path (at the overvoltage protection element) is formed along the protective transistor so that substantially the rest of the overvoltage pulse can be conducted away via the second current path.

In the context of this disclosure, the wording "substantially the rest of the overvoltage pulse" should be understood to mean the overvoltage being conducted away in such a way that electrically downstream component parts or components are protected against an overvoltage or a damaging current surge. Here, it is conceivable for all the remaining overvoltage pulse to be conducted away by means of the circuit of the above type. However, the aforementioned wording should also be understood to mean that a significant portion of the remaining overvoltage pulse is conducted away via the second current path, although there remains a residual portion of the overvoltage pulse that is not conducted away. Depending on the application, e.g. 60%, 70%, 80%, 90%, 95% or practically 100% of the remaining overvoltage pulse can thus be considered to be "substantially the rest of the overvoltage pulse". Depending on the design and dimensions of the component parts in the circuit, e.g. 100 V, as the remaining overvoltage pulse, can be conducted away via the second current path up to 40 V, up to 30 V, up to 20 V, up to 10 V or up to practically 0 V.

In the circuit according to an embodiment of the invention, the protective transistor is not used as a series element but instead as a parallel element. If an overvoltage pulse is applied at the input side of the circuit, the protective transistor changes from the closed mode into the open mode and conducts another part of the overvoltage pulse away, in addition to the overvoltage protection element, via a flow towards a reference potential. In this way, an equilibrium is formed between the first and second current paths at the overvoltage protection element and at the protective transistor so that the overvoltage pulse at the input side of the protective circuit can ultimately be substantially suppressed. Electrically downstream component parts or components are thus protected against an overvoltage or a damaging current surge.

An advantage of the circuit according to an embodiment of the invention is that the protective transistor is not connected in series with the main current. The protective transistor thus does not influence the normal functioning of the circuit, regardless of the magnitude of the rated current. Even at relatively high currents (for example 4 A), the voltage loss of the circuit is very low by comparison with conventional protective circuits.

Furthermore, the circuit is advantageous in that high-capacitance electrolytic capacitors do not have to be used. This saves space. The circuit described above is thus a very simple, inexpensive and compact solution.

Preferably, the protective transistor is a field-effect transistor which is wired between an output potential at the output side and a reference potential by its drain and source terminals. Preferably, the protective transistor is a field-effect transistor of the NMOS type, the drain terminal of the protective transistor being located on the output potential at the output side and the source terminal of the protective transistor being located on the reference potential.

However, it is also conceivable for a field-effect transistor of the PMOS type to be used as the protective transistor. In this case, drain and source terminals would accordingly be defined the opposite way around such that the source terminal of the protective transistor is located on the output potential at the output side and the drain terminal of the protective transistor is located on the reference potential.

The use of a field-effect transistor is advantageous in that it can be configured with a very small forward resistance between the drain terminal and source terminal ("RDS(on)"). In this way, the loss properties are minimised at the protective transistor while the conduction properties of an electrical current surge owing to an overvoltage pulse are improved. When in open mode, the protective transistor ideally functions as a virtual short circuit which effectively conducts current surges from an overvoltage pulse away towards the reference potential. This increases the protection for electrically downstream component parts and components that are protected by the circuit.

Preferably, the protective transistor is actuated by means of a control device which controls the change of the protective transistor between a closed mode and an open mode.

If the protective transistor is designed as a field-effect transistor, the control device is connected in parallel with the drain and source terminals of the protective transistor, the control device comprising a series connection consisting of a Zener diode and a resistor, and the gate terminal of the protective transistor being connected between the Zener diode and the resistor.

In the following, a topology will be described in the case of an NMOS protective transistor being used. A topology of this type functions as follows. If an overvoltage pulse is applied at the input side of the circuit, the current through the overvoltage protection element increases and thus so does the voltage at the control device. If this voltage reaches the breakdown voltage of the Zener diode of the control device, which diode is wired in the reverse direction, said diode breaks down. If the voltage at the control device increases further, so too does the voltage at the resistor, minus the breakdown voltage at the Zener diode, a corresponding current flowing towards the reference potential through the resistor of the control device. The voltage at the resistor corresponds to the value of the gate-source voltage at the protective transistor. If this voltage reaches a threshold voltage of the protective transistor, the protective transistor switches from the closed mode into the open mode. In the process, the second current path is formed along the protective transistor so that a current from the overvoltage pulse can flow towards the reference potential simultaneously via the overvoltage protection element and the protective transistor. In this way, the protective transistor suppresses an overvoltage pulse at the input side of the protective circuit, in a manner controlled by the control device. An equilibrium thus forms between the two current paths, and so the overvoltage pulse abates without interference currents loading electrically downstream components.

In normal operation, the Zener diode of the control device is, however, in a closed mode so that no significant amount of current flows through the resistor of the control device. The resistor therefore draws the gate-source voltage of the protective transistor to the reference potential. As a result, the gate-source voltage of the protective transistor is kept at a level below a threshold voltage. During normal operation, the protective transistor is thus in a closed mode and does not influence the output voltage applied at the output side of the circuit for supplying downstream components.

As an alternative to being designed as a field-effect transistor, the protective transistor could also have a bipolar design, in which collectors and emitters are connected in parallel with the output side of the circuit. In this case, the control device would then at least have to be modified such that it is connected in parallel with the collector and emitter terminals of the protective transistor, the base terminal of the protective transistor being connected between the Zener diode and the resistor of the control device by means of a base resistor. By means of the Zener diode, a base current can then be set at the base resistor, which current controls the protective transistor between the closed mode and the open mode for the operation of the protective circuit.

Advantageously, the circuit set out above is used in an arrangement comprising at least one voltage transformer, the voltage transformer being connected at the output side of the circuit in order to transform an input-side supply voltage into an operating voltage for the components connected electrically downstream of the voltage transformer. Advantageously, an arrangement of this type is in turn used in an electronic device. The electronic device can include any type of device. For example, a corresponding circuit arrangement is used in an industrial programmable logic controller (PLC).

FIG. 1 shows a circuit arrangement according to the prior art for protection against overvoltages, as was briefly described at the outset. The arrangement comprises a circuit S having an input side 1, to which an input voltage u1 of +24 V DC voltage is applied in normal operation. The output voltage u2 can be tapped at the output side 2 of the circuit S. Connected at the output side 2 is a voltage transformer NT which, for its part, provides a VCC operating voltage u3 at an operation side 3 for electrically downstream components in an electronic device. For example, an operating voltage can be provided for integrated components on a system board of an electronic device.

The circuit S comprises an overvoltage protection element V2 which, in accordance with FIG. 1, is designed as a suppressor diode and is wired in parallel with the input side 1. A reverse voltage protection diode V1 and a series filter coil L1 are connected in series in a downstream series path. Furthermore, a buffer capacitor C1 is connected in parallel at the output side 2 of the circuit S. The buffer capacitor C1 can for example be designed as an electrolytic capacitor.

As already mentioned at the outset, an overvoltage pulse at the input side is suppressed by means of this conventional circuit S such that an electrical current pulse is conducted away towards the reference potential (0 V) by means of the suppressor diode V2 via a first current path i1. The rest of the overvoltage pulse is filtered by means of the filter elements L1 and C1 so that ideally the overvoltage pulse can be suppressed. Downstream components, such as the voltage transformer NT or other components on the operation side 3, are protected against damage. Negative overvoltage pulses at the input side 1 are suppressed by means of the reverse voltage protection diode V1, which is closed when in a state of this type.

A circuit S of this type according to the prior art is disadvantageous in that a buffer capacitor C1 for overvoltage pulses of a predetermined standard has to have a very high capacitance and thus requires a corresponding amount of installation space. A circuit of this type can thus rarely be implemented in miniaturised constructions of microdevices.

Figure 2:
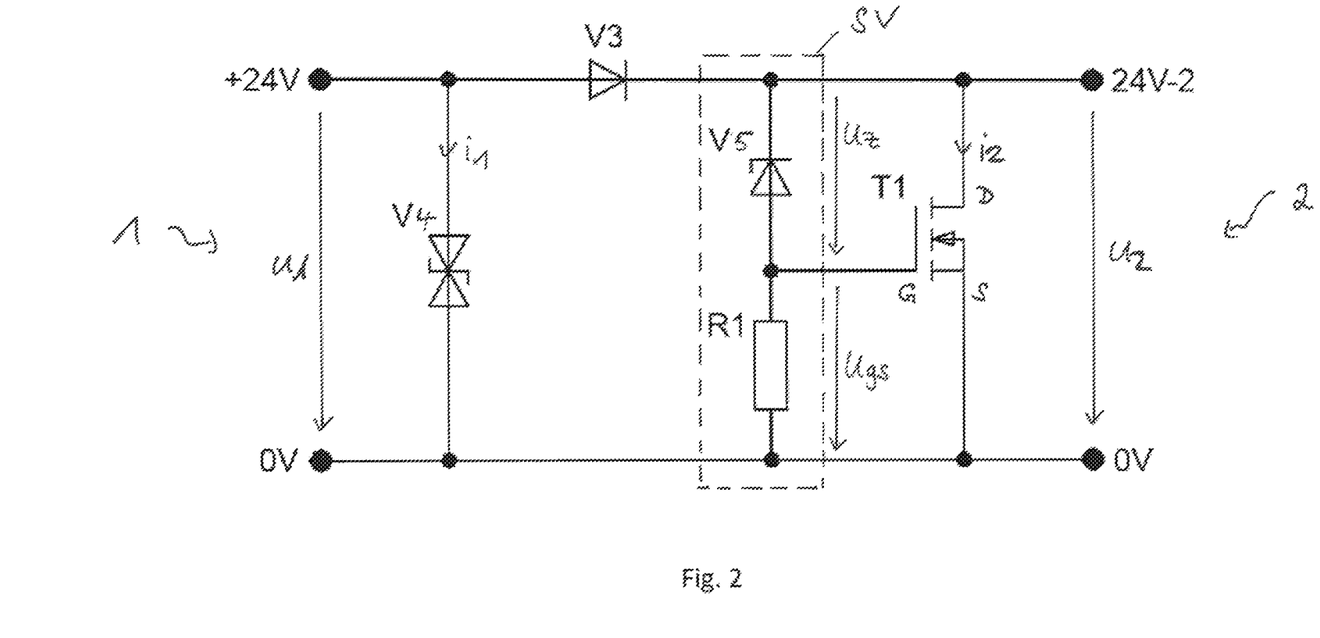
FIG. 2 shows a first embodiment of a protective circuit according to the invention.

FIG. 2 shows a first embodiment of a circuit S according to the invention, which is distinguished substantially in that, instead of the filter elements L1 and C1 according to the arrangement from FIG. 1, a protective transistor T1 and a control device SV are now installed in a parallel connection between the input side 1 and the output side 2 of the circuit.

According to FIG. 2, the protective transistor T1 is designed as a field-effect transistor in an NMOS construction. The drain terminal D of the protective transistor T1 is placed at an output potential 24V-2, whilst the source terminal S of the protective transistor T1 is placed at the reference potential 0 V. The protective transistor T1 is thus connected by its drain and source terminals D and S in parallel with the output side 2 of the circuit S.

When viewed from the relatively high potential towards the reference potential 0 V, the control device SV for actuating the protective transistor T1 comprises a series connection consisting of a Zener diode V5 connected in the reverse direction and an electrical resistor R1. The gate terminal G of the protective transistor T1 is connected between the Zener diode VS and the resistor R1.

Both the suppressor diode V4 and the reverse voltage protection diode V3 according to FIG. 2 function in a substantially identical manner to the corresponding elements V2 and V1 of FIG. 1.

According to the embodiment of FIG. 2, the circuit S functions as follows.

During normal operation, the circuit S functions at a DC supply voltage of +24 V at the input side 1. If the input voltage u1 rises excessively at the input side 1 such that an overvoltage pulse occurs, the suppressor diode V4 passes into an open mode when a corresponding breakdown voltage is exceeded. A corresponding current pulse is conducted away towards the reference potential 0 V via a first current path i1. In this way, at least part of an overvoltage pulse at the input side 1 is suppressed by means of the suppressor diode V4.

The voltage rising at the suppressor diode V4 also results in the voltage increasing at the control device SV, which is connected in parallel, and this voltage increase is merely reduced by the forward voltage at the reverse voltage protection diode V3 (typically approximately 0.7 V). If the voltage Uz at the Zener diode V5 exceeds the breakdown voltage thereof, an electrical current flows through the Zener diode V5 and the resistor R1 towards the reference potential 0 V. This leads to a drop in an electrical voltage at the resistor R1. This voltage corresponds to the gate-source voltage Ugs at the protective transistor T1. If this voltage exceeds a threshold voltage, the protective transistor T1 changes from an initial closed mode into an open mode, a second current path i2 parallel to the first current path i1 being formed along the protective transistor T1. In this way, an equilibrium is set between the two current paths i1 and i2 along the respective overvoltage protection elements V4 and T1, and so the overvoltage pulse at the input side 1 can be suppressed effectively by the circuit S.

The following example calculation is intended to illustrate the action of the circuit S once again. By way of example, the Zener diode V5 is of such a size that it has a breakdown voltage Uz of 33 V. If the input voltage u1 at the input side 1 of the circuit S thus increases beyond +24 V and the voltage u2 at the control device SV exceeds a value of 33 V (so that in the end the breakdown voltage Uz of 33 V is exceeded at the Zener diode V5 connected in the reverse direction), the voltage at the resistor R1 increases to u2−Uz. If this voltage reaches the threshold voltage Ugsth of the protective transistor T1 (generally approximately 2 V), said transistor changes from the closed mode into an open mode, as already explained. The protective threshold is thus Uz+Ugsth—approximately 35 V in this example.

If the input voltage u1 drops further such that the gate-source voltage Ugs drops below the threshold Ugsth, the protective transistor T1 changes from the open mode back into the closed mode. If the voltage u1 drops further below Uz, the Zener diode V5 also closes and no more current flows therethrough. The voltage at R1 is then 0 V.

The size of the suppressor diode V4, the control device SV and the protective transistor T1 should be selected such that sufficient suppression of an overvoltage pulse can be ensured.

By means of the circuit illustrated in FIG. 2, electronic components (not shown) connected at the output side 2 can thus be effectively protected against interference pulses. Furthermore, the circuit S has the critical advantage that, owing to the protective transistor T1 being connected in parallel, said transistor is virtually "invisible" during normal operation of the circuit S and does not play a part in the power loss. This is because in normal operation the protective transistor T1 behaves practically as in open-circuit operation, whereas said transistor only has short-circuit-like properties in the event of an overvoltage. According to FIG. 2, the power loss of the circuit S is only limited to the forward voltage of the reverse voltage protection diode V3. Furthermore, in the circuit according to FIG. 2, there is no need for expensive and large electrolytic buffer capacitors, as are required in conventional circuits according to the prior art as per FIG. 1.

According to an alternative embodiment (not shown) to FIG. 2, the protective transistor T1 can also be designed as a PMOS transistor instead of an NMOS transistor. In this case, the source terminal S of T1 is located at the output potential 24V–2 and the drain terminal D at the reference potential 0 V. Furthermore, the control device SV can be designed such that the Zener diode V5 and the resistor R1 are wired in the opposite manner to the manner shown in FIG. 2. In this case, the resistor R1 is wired between the output potential 24V–2 and the gate terminal G of T1, while the Zener diode V5 is wired between the gate terminal G of T1 and the reference potential 0 V.

Figure 3:
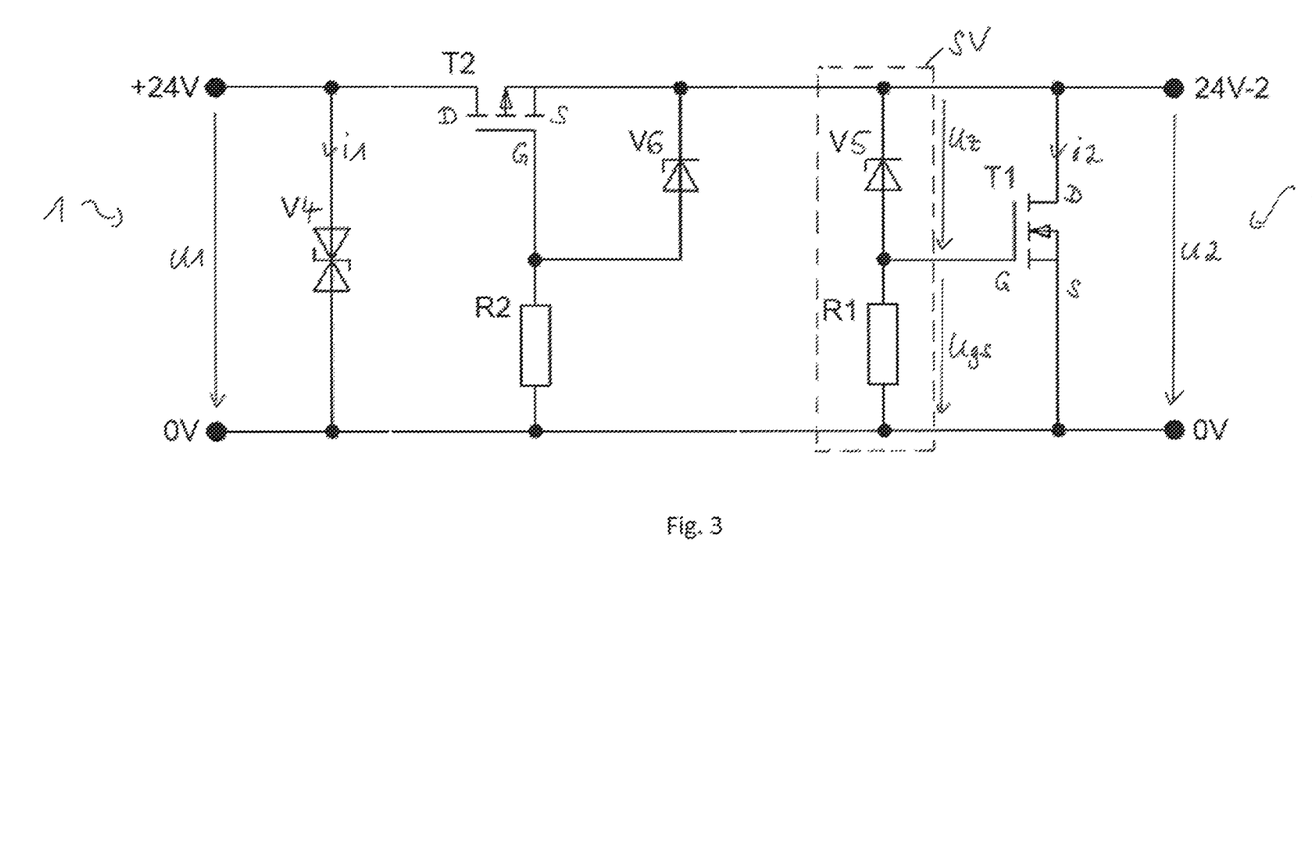
FIG. 3 shows another embodiment of a protective circuit according to the invention.

FIG. 3 shows an alternative embodiment of a circuit S according to the invention, which differs from the circuit S of FIG. 2 merely on account of a different reverse voltage protection circuit.

Instead of a reverse voltage protection diode V3 in accordance with FIG. 2, a reverse voltage protection is implemented in the circuit S in FIG. 3 by means of a field-effect transistor T2 in the series path between the suppressor diode V4 and the control device SV for the protective transistor T1. The field-effect transistor T2 is in a PMOS design. The drain terminal D of the transistor T2 is oriented towards the input side 1 of the circuit 1, while the source terminal S of the transistor T2 is oriented towards the output side 2 in the flow direction. The transistor T2 is wired by its gate terminal G to the reference potential 0 V via a second resistor R2. An additional Zener diode V6 for limiting the gate-source voltage to below the maximum permissible value (mostly 20 V) is wired in parallel with the source and gate terminals S, G of the transistor T2. Circuitry of this type constitutes a common reverse voltage protection circuit.

If the input side 1 has a polarity according to FIG. 3 having a positive input voltage u1, as shown, the transistor T2 is closed in the first instance since u2=0. Depending on the technology, MOS transistors contain a parasitic diode between the drain and base, which is connected to the source, which diode is arranged with the anode at the drain and the cathode at the source in the case of the PMOS design. In this case, this diode is then connected in a conductive manner in the forward direction and u2 is thus equal to u1 minus the diode forward voltage. The gate-source voltage is thus negative and the transistor T2 is open. As a result of an accordingly small size of the channel resistance ("RDS(on)") at the transistor T2, the power loss at the transistor T2 can also be minimised accordingly. Thus, it is indeed conceivable for a power loss of the circuit S according to FIG. 3 to be made even lower than a power loss of the circuit S according to FIG. 2.

In the case of a reverse polarity of the circuit S of FIG. 3, whereby the input voltage u1 would be negative, the transistor T2 moves into a closed mode because the parasitic internal diode is connected in the reverse direction and the gate G and source S adopt the same potential, i.e. Ugs=0. The transistor T2 thus prevents a reverse polarity at the output side 2 of the circuit S.

The further functioning of the circuit S of FIG. 3 corresponds substantially to the circuit S of FIG. 2 and does not need to be explained further at this juncture.

FIG. 4 again shows the circuit S according to FIG. 2 in an arrangement having a voltage transformer NT which is wired at the output side 2 of the circuit S and is supplied by means of an output voltage u2 of the circuit S. The voltage transformer NT in turn generates a VCC supply voltage u3, which is provided to components connected downstream on an operation side 3.

Figure 4:
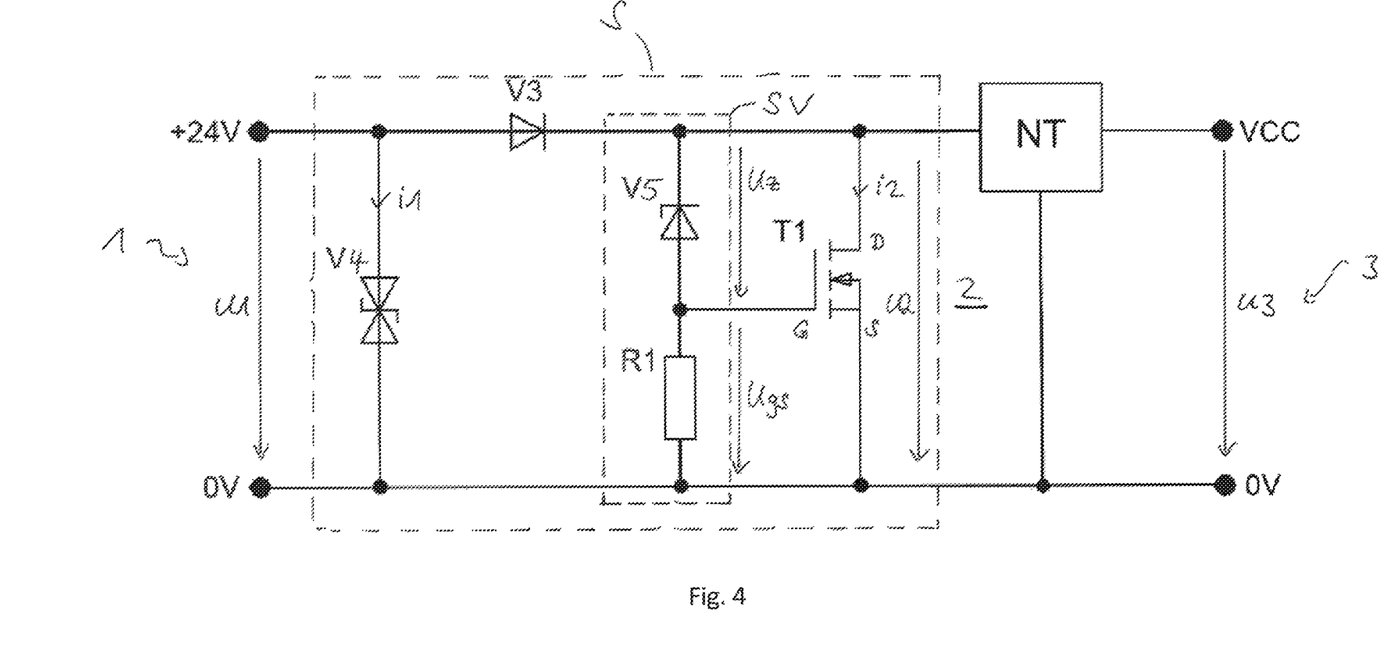
FIG. 4 shows an arrangement comprising a protective circuit according to FIG. 2 and other components.

For example, a circuit arrangement of this type as shown in FIG. 4 is used in electronic devices which are supplied by means of a DC supply voltage of +24 V and contain internal components and component parts, for example integrated components (ICs) on a system board. Such devices can, for example, be industrial programmable logic controllers. Such a circuit arrangement can be used by any other type of devices in control and/or automation technology or other industrial applications, as well as by other electronic devices.

The described embodiments of a circuit S according to the invention have merely been selected by way of example and have no limiting effect on the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 input side
2 output side 3 operation side
u1 input voltage
u2 output voltage
u3 operating voltage
i1 first current path
i2 second current path
V1, V3 reverse voltage protection diode
V2, V4 overvoltage protection element
V5, V6 Zener diode
R1, R2 resistor
S circuit
T1 protective transistor
T2 reverse voltage protection transistor
L1 series filter coil
C1 buffer capacitor
NT voltage transformer
VCC operating voltage for downstream components
24 V–2 output potential
+24 V input potential
0 V reference potential
SV control device
G gate
S source
D drain
Uz Zener voltage
Ugs gate-source control voltage of the MOS transistor
Ugsth gate-source threshold voltage

The invention claimed is:

1. A circuit for protection against overvoltages, the circuit comprising:
    an input side to which an input voltage can be applied;
    an output side at which an output voltage can be tapped;
    an overvoltage protection element which is connected in parallel with the input side and which is configured to, when an overvoltage pulse occurs at the input side, conduct at least part of the overvoltage pulse away via a first current path; and
    a protective transistor which is connected in parallel with the output side,
    wherein, when the overvoltage pulse occurs at the input side, the protective transistor changes from a closed mode into an open mode forming a second current path parallel to the first current path along the protective transistor, which second current path does not include a resistor, so that substantially the rest of the overvoltage pulse is conducted away via the second current path.

2. The circuit according to claim 1, wherein the protective transistor is a field-effect transistor which is wired between an output potential at the output side and a reference potential by a drain terminal of the protective transistor and a source terminal of the protective transistor.

3. The circuit according to claim 2, wherein the protective transistor is a field-effect transistor of the NMOS type,
    wherein a drain terminal of the protective transistor is located on the output potential at the output side, and
    wherein a source terminal of the protective transistor is located on the reference potential.

4. The circuit according to claim 2, wherein the protective transistor is actuated by a control device which is connected in parallel with the drain terminal of the protective transistor and the source terminal of the protective transistor of the protective transistor, the control device including a series connection consisting of a Zener diode and a resistor, wherein a gate terminal of the protective transistor is connected between the Zener diode and the resistor.

5. The circuit according to claim 1, further comprising a reverse voltage protection circuit connected electrically downstream of the overvoltage protection element towards the output side.

6. The circuit according to claim 5, wherein the reverse voltage protection circuit includes a diode which is wired in a series path between the overvoltage protection element and the protective transistor.

7. The circuit according to claim 5, wherein the reverse voltage protection circuit includes a field-effect transistor of the PMOS type, which is connected by a source terminal and a drain terminal in a series path between the overvoltage protection element and the protective transistor, a Zener diode being connected in parallel with a gate terminal and a source terminal of the field-effect transistor, and the gate terminal being connected to a reference potential via a resistor.

8. The circuit according to claim 1, wherein the input side is designed for a DC supply voltage of +24 V.

9. An electronic system comprising:
    a circuit for protection against overvoltages, the circuit comprising:
        an input side to which an input voltage can be applied;
        an output side at which an output voltage can be tapped;
        an overvoltage protection element which is connected in parallel with the input side and which is configured to, when an overvoltage pulse occurs at the input side, conduct at least part of the overvoltage pulse away via a first current path; and
        a protective transistor which is connected in parallel with the output side, and
    at least one voltage transformer connected to the output side of the circuit in order to transform the input voltage into an operating voltage for components connected electrically downstream of the voltage transformer,
    wherein, when the overvoltage pulse occurs at the input side, the protective transistor changes from a closed mode into an open mode forming a second current path parallel to the first current path along the protective transistor, which second current path does not include a resistor, so that substantially the rest of the overvoltage pulse is conducted away via the second current path.

10. A circuit for protection against overvoltages, the circuit comprising:
    an input side to which an input voltage can be applied;
    an output side at which an output voltage can be tapped;
    an overvoltage protection element which is connected in parallel with the input side and which is configured to, when an overvoltage pulse occurs at the input side, conduct at least part of the overvoltage pulse away via a first current path; and
    a protective transistor which is connected in parallel with the output side,
    wherein, when the overvoltage pulse occurs at the input side, the protective transistor changes from a closed mode into an open mode forming a second current path parallel to the first current path along the protective transistor so that substantially the rest of the overvoltage pulse can be conducted away via the second current path, and
    wherein the protective transistor is a field-effect transistor which is wired between an output potential at the output side and a reference potential by a drain terminal of the protective transistor and a source terminal of the protective transistor.

11. The circuit according to claim 10, wherein the protective transistor is a field-effect transistor of the NMOS type,
wherein a drain terminal of the protective transistor is located on the output potential at the output side, and
wherein a source terminal of the protective transistor is located on the reference potential.

12. The circuit according to claim 10, wherein the protective transistor is actuated by a control device which is connected in parallel with the drain terminal of the protective transistor and the source terminal of the protective transistor of the protective transistor, the control device including a series connection consisting of a Zener diode and a resistor, wherein a gate terminal of the protective transistor is connected between the Zener diode and the resistor.

13. The circuit according to claim 10, further comprising a reverse voltage protection circuit connected electrically downstream of the overvoltage protection element towards the output side.

14. The circuit according to claim 13, wherein the reverse voltage protection circuit includes a diode which is wired in a series path between the overvoltage protection element and the protective transistor.

15. The circuit according to claim 13, wherein the reverse voltage protection circuit includes a field-effect transistor of the PMOS type, which is connected by a source terminal and a drain terminal in a series path between the overvoltage protection element and the protective transistor, a Zener diode being connected in parallel with a gate terminal and a source terminal of the field-effect transistor, and the gate terminal being connected to a reference potential via a resistor.

16. The circuit according to claim 10, wherein the input side is designed for a DC supply voltage of +24 V.

* * * * *